United States Patent [19]

Forster et al.

[11] Patent Number: 4,466,291

[45] Date of Patent: Aug. 21, 1984

[54] EXTENSOMETER

[75] Inventors: Arthur D. Forster, Blaydon; James S. Mitchell, Newcastle Upon Tyne, both of England

[73] Assignee: Northern Engineering Industries plc, Newcastle Upon Tyne, England

[21] Appl. No.: 411,376

[22] Filed: Aug. 26, 1982

[30] Foreign Application Priority Data

Sep. 30, 1981 [GB] United Kingdom ................. 8129561

[51] Int. Cl.³ ............................................. F16B 31/02
[52] U.S. Cl. .................................. 73/761; 33/147 D; 33/125 B; 33/172 R
[58] Field of Search ............ 33/147 D, 148 D, 125 B, 33/172 R; 73/761; 374/5

[56] References Cited

U.S. PATENT DOCUMENTS

| 2,995,033 | 8/1961 | Stifano | 73/761 |
| 3,943,819 | 3/1976 | Charron | 73/761 |
| 4,300,397 | 11/1981 | Kempen | 73/761 |

FOREIGN PATENT DOCUMENTS 2060186 4/1981 United Kingdom ................. 73/761

479972 11/1975 U.S.S.R. ................................. 73/761

Primary Examiner—William D. Martin, Jr.

[57] ABSTRACT

An extensometer, for use in determining extensions or creep in studs or bolts for example, has a first tubular member in which slides a tube assembly carrying a second collet-like member. First and second abutment formations on the first and second members, respectively, engage internal shoulders in a stud. Upper and lower brackets which are restrained against separation, by a spring, beyond a datum position, are fixed relatively to the first and second members, respectively. A dial gauge (0.01 mm divisions), which co-operates with a datum block on the lower bracket, is mounted on the upper bracket. With the extensometer in position, the spring is stressed by relatively moving the first and second members to position the second abutment formation below the lower shoulder in the stud. A plunger member is moved relative to the second member to expand the spring fingers thereof outwardly. The spring is allowed to relax and pull the second abutment formation into contact with the stud shoulder. The dial gauge can be then read.

12 Claims, 8 Drawing Figures

EXTENSOMETER

BACKGROUND TO THE INVENTION

The invention relates to extensometers.

It is important that the studs or bolts securing steam chest covers or turbine cylinder flanges, for example, are correctly tensioned to avoid either loss of steam if they are under-tensioned or premature failure of the studs or bolts if they are over-tensioned. Ideally, the studs or bolts should be stressed by a predetermined amount of strain when they are tensioned. The stress in the stud or bolt depends on the strain produced by the applied tension. The corresponding extension can be calculated from the stress so that the strain in the stud or bolt can be effectively measured by proper measurement of the extension of the stud or bolt. To date, however, it has not been possible to measure the extension with sufficient accuracy.

It is an object of the invention to provide an extensometer which can be used to measure the extension of a component such as a stud or bolt.

BRIEF SUMMARY OF THE INVENTION

An extensometer, according to the invention, comprises
(a) first and second members mutually restrained so as to be capable of relative movement only along a rectilinear axis;
(b) first and second abutment formations defined on said first and second members, respectively, said first and second abutment formations facing in opposite directions along said axis;
(c) a spring arranged in relation to said members so as to be stressed by relative movement of said members;
(d) indicator means which co-operate with said members to indicate the extent of said relative movement; and
(e) a third member;
(f) one of said abutment formations being on resilient fingers which extend lengthwise in relation to said axis, which are disposed about said axis and which are in sliding engagement with said third member, said fingers being displaceable transversely of said axis to a position in which said fingers are relatively strained by relative movement along said axis between said fingers and said third member, reverse relative movement along said axis between said fingers and said third member allowing said fingers to return to a position in which said fingers are relatively unstrained .

Preferably, said spring is stressed by relative movement of said first and second members in a sense to separate said first and second abutment formations.

Preferably, said fingers are displaceable transversely of said axis away therefrom so as to strain said fingers.

Alternatively, said fingers are displaceable transversely of said axis away therefrom so as to relieve said fingers.

In one form of extensometer, for example, said other abutment formation is a plane surface on said member. In an alternative form, said other abutment formation is on resilient fingers which extend lengthwise in relation to said axis and which are disposed about said axis, said fingers being displaceable transversely of said axis towards said axis to strain said fingers.

BRIEF DESCRIPTION OF THE DRAWINGS

Extensometers will now be described by way of example to illustrate the invention with reference to the accompanying drawings, in which.

DESCRIPTION OF THE INVENTION

FIGS. 1A, 1B, 1C and 2 show an extensometer for measuring the extension produced in components such as studs or bolts, for example, as the result of tensioning. Typically, for example, the studs or bolts are bottoming or non-bottoming studs, stud bolts or tap bolts as used for securing parts of steam power generating equipment, such as steam chest covers or turbine cylinder flanges.

The stud or bolt is required to undergo a specified extension when it is tensioned. Such tensioning is typically achieved by heating the stud or bolt, turning the nut or bolt through a given angle and allowing the stud or bolt to cool.

Figure 1A:
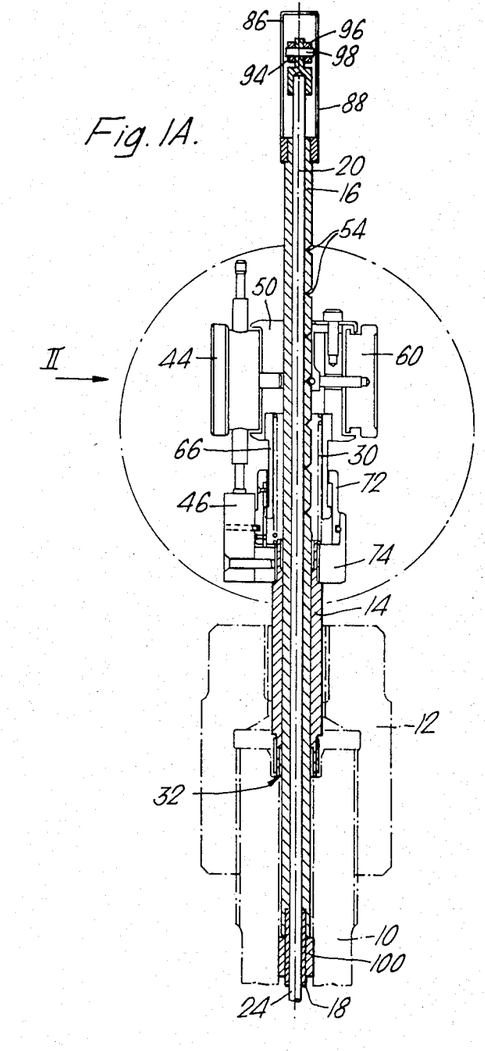
FIGS. 1A and 1B are upper and lower parts respectively, of a vertical longitudinal section through a first form of extensometer.
Figure 1B:
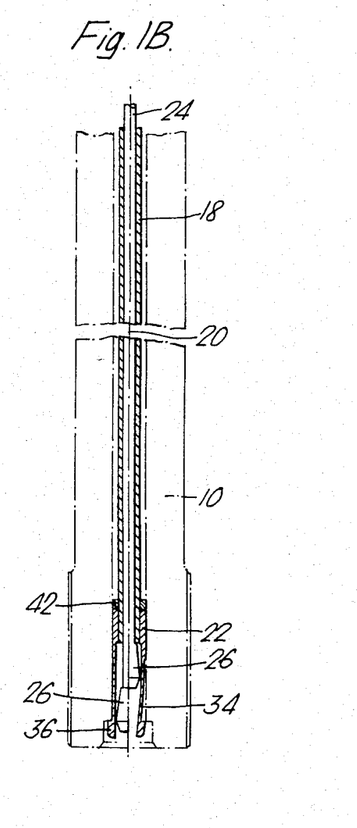
Figure 1C:
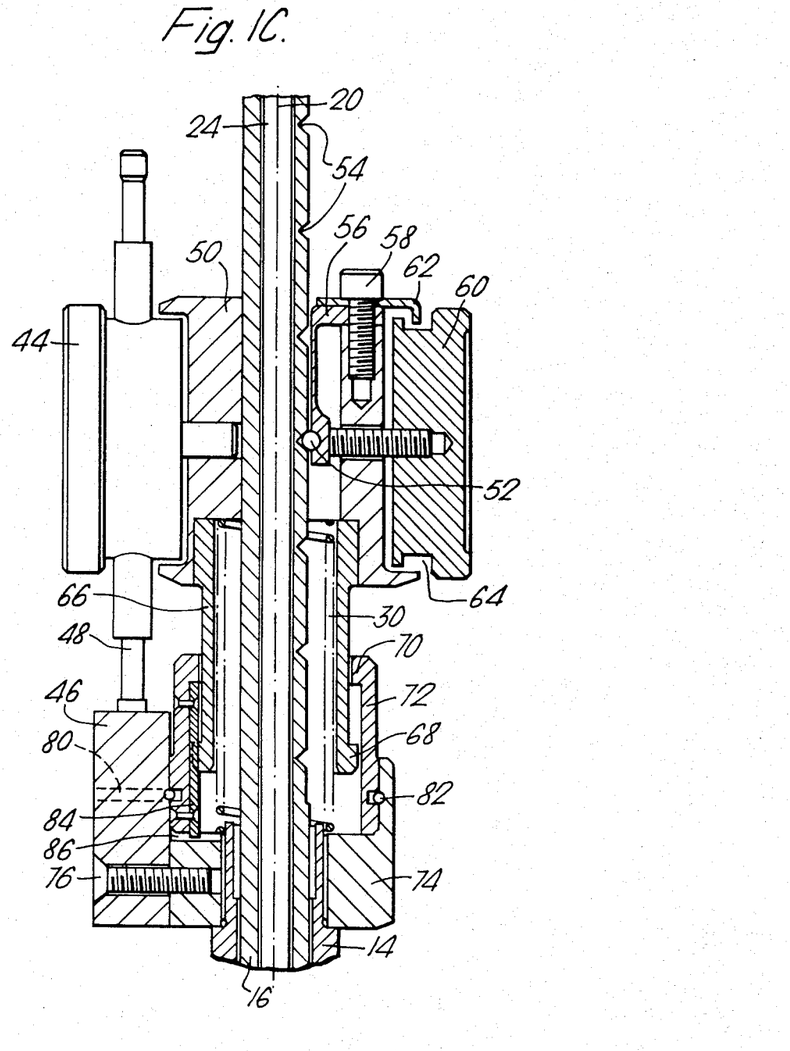
FIG. 1C is a vertical section on an enlarged scale of the part encircled in FIG. 1A.

FIGS. 1A and 1B show a non-bottoming stud 10 drawn in chain-dot line which would be screwed at its lower end into a tapped opening in a part (not shown). A cap nut 12 on the upper end of the stud 10 would engage an upward-facing surface on another part (not shown).

The stud 10 is hollow so that a heater can be inserted into the stud. The extensometer comprises the following main items: a first member in the form of an outer tube 14; an inner tube which has an upper tube part 16 and a lower tube part 18 joined together end-to-end and slidable relative to the outer tube 14 along the central longitudinal axis 20; an annular collet-like second member 22 screwed onto the lower end of the lower tube part 18; a central rod 24 slidably guided within the upper and lower tube parts 16, 18 and carrying at its lower end a third member in the form of a plunger 26; a dial gauge 44; a datum block 46; and a spring 30 which is stressed by relative movement between the members 14, 22.

The first and second members 14 and 22, respectively, are thus mutually restrained so as to be capable of relative movement only along the axis 20.

Figure 3:
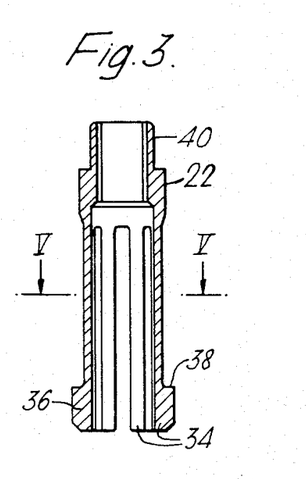
FIGS. 3 and 4 are longitudinal cross sections on an enlarged scale of part of the extensometer shown in FIGS. 1A, 1B and 2.
Figure 4:
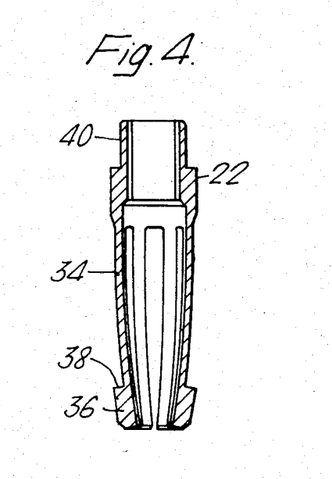
Figure 5:
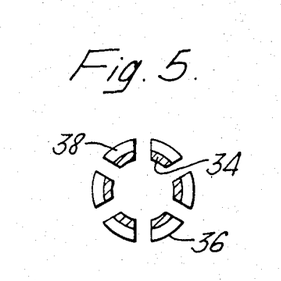
FIG. 5 is a transverse cross section on the line V—V in FIGS. 3.

The lower end of the first member 14 provides a downwardly-facing annular abutment formation 32. The second member 22 is of spring steel and comprises six resilient fingers 34 equiangularly spaced about the axis 20 (FIGS. 3 to 5). The fingers 34 each have at their extremities an outwardly-directed projection 36 providing an upwardly-facing shoulder 38. The shoulders 38 severally and collectively form an abutment formation on the second member 22. In their relaxed state, the fingers 34 curve inwardly towards the axis 20. The member 22 has opposed flat-faces 40 which accommodate a spanner or like tool which is used to screw the member 22 on to the lower end of the lower tube part 18. A threaded collar 42 is screwed onto the lower tube part 18 above the member 22 and is permanently locked on the lower tube part 18 to provide a location shoulder for the member 22.

The dial gauge 44 has a movable spring-loaded probe 48 which is in contact with the upper surface of the datum block 46. The dial gauge 44 is marked in divisions each representing 0.01 millimetre (mm).

The dial gauge 44 is mounted on an upper tubular bracket 50 coaxial with the upper tube part 16. The bracket 50 is slidable along the tube part 16 and can be locked relatively to the tube part 16 at spaced-apart positions. The bracket 50 can be locked in each such position by the engagement of a cylindrical detent 52 with a V-section transverse groove 54 provided in the tube part 16 at the position. The detent 52 is carried by a spring arm of an angle piece 56 fixed to the bracket 50 by a screw 58. The spring arm of the angle piece 56 is parallel to the axis 20 and is located in a slot in the bracket 50. The detent 52 is held in a groove 54 under load by a finger screw 60 which engages the spring arm of the angle piece 56. A second angle piece 62 is also fixed to the bracket 50 by the screw 58, the free arm of the angle piece 62 extending into a circumferential groove 64 in the head of the finger screw 60 to retain the screw 60 on the bracket 50.

The bracket 50 has a recess in its lower end in which a tubular extension 66 is a tight fit. The free end of the extension 66 has an annular stop projection 68 which is engageable with an annular stop projection 70. The projection 70 is on the free end of a tubular extension 72 which fits in a recess in the upper end of a lower tubular bracket 74. The datum block 46 is secured by a screw 76 in a vertical slot in the bracket 74. The bracket 74 is screwed on the upper end of the first member 14.

The projections 68 and 70, when engaged, determine a datum position of the block 46 so that the spring 30 within the dial gauge loading the probe 48 against the block 46 is always in compression. Accordingly, all readings can be related to the datum position. During relative movement of the members 14 and 22, a lower abutment surface on projection 68 engages an upper abutment surface on the bracket 74 to limit said relative movement to prevent possible damage to the dial gauge 44.

The datum block 46 is recessed on each side at 78 (see FIG. 2) to accommodate the ends 80 of a spring clip 82. The clip 82 engages a circumferential groove in the tubular extension 72 which is split into two to facilitate assembly.

The extension 72 has an internal key 84 parallel to the axis 20. The stop projection 68 has a slot which accommodates the key 84 so that relative rotation between the extension 66 and the extension 72 is prevented. The key 84 extends into a slot 86 in the lower bracket 74 so that relative rotation between the extension 72 and the bracket 74 is prevented.

The spring 30 is a coil compression spring which surrounds the upper tube part 16 and is trapped between the brackets 50 and 74. When the extensometer is not in use, the brackets 50 and 74 are held apart by the spring 30, the stop projections 68 and 70 being in engagement with one another.

Figure 2:
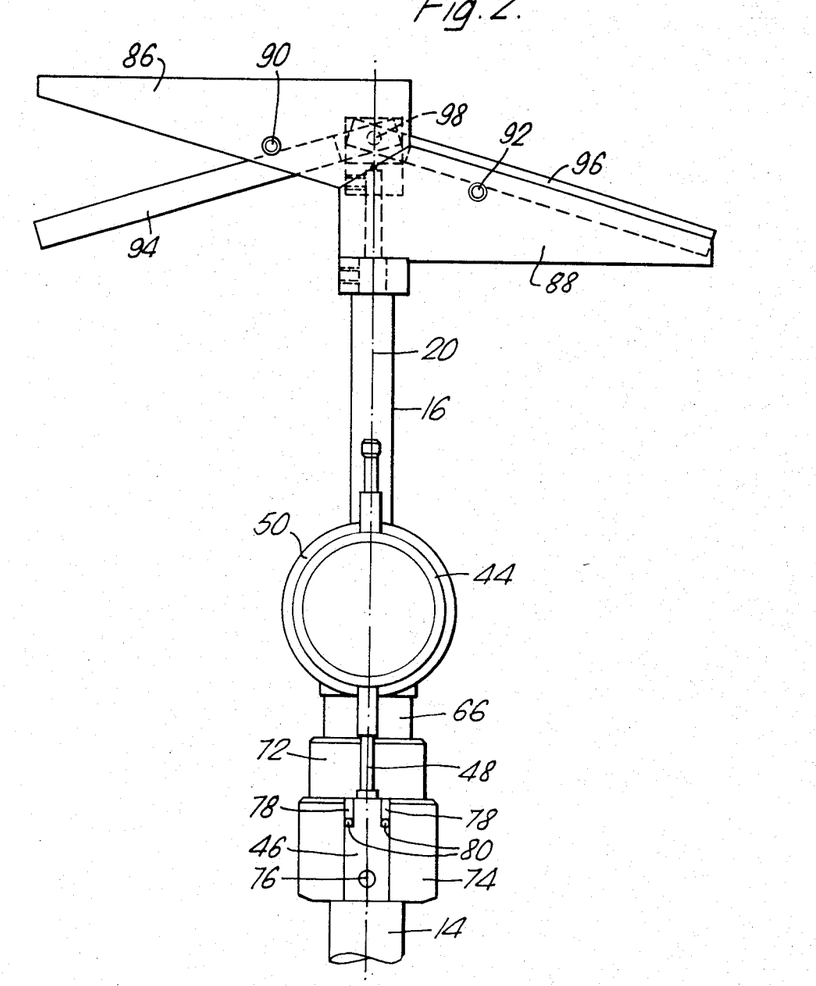
FIG. 2 is a view of the upper part of the extensometer shown in FIG. 1 on a slightly enlarged scale and as seen in the direction II on FIG. 1A.

The upper tube part 16 has fixed handles 86 and 88 secured to its upper end (FIG. 2). The handles 86 and 88 have respective pivot pins 90 and 92 which are engaged by levers 94 and 96, respectively. The levers 94 and 96 are retained to the pivot pins 90 and 92, respectively, by brackets (not shown). Adjacent ends of the levers 94 and 96 are pivoted on a common pivot pin 98 mounted on the upper end of the rod 24.

OPERATION

Typical studs and bolts may vary in length from 250 mm to 380 mm or longer (up to 760 mm). The outside diameters across the threads range from 45 mm to 115 mm with the internal diameters being 17.4 mm or 23.8 mm.

The stud shown in the drawings is typically 254 mm long with an outside diameter 44.4 mm and an internal diameter of 17.4 mm.

Where such a stud is made of chrome-molybdenum steel or of chrome-molybdenum-vanadium steel the required stress in the stud when it is tensioned is some 309 mega pascals which produces a strain of some 0.15%. The extension which the stud 10 should undergo is 0.28 mm.

Before the stud is tensioned, the bracket 50 of the indicator assembly 28 is adjusted to a position along the upper tube part 16 so that the distance between the abutment formations 32 and 38 when the projections 68 and 70 are in engagement with one another does not exceed the distance between the internal shoulders of the stud 10. The dial gauge 44 is zeroed, with the probe 48 in contact with the datum block 46, by loosening the dial gauge rim and turning it to turn the dial face. The extensometer is then inserted downwardly through the stud 10 so that the upper abutment formation 32 engages the upper internal shoulder in the stud 10 as shown in FIG. 1A. The extensometer is guided relative to the bore of the stud 10 by the second member 22 and a guide sleeve 100 secured to the lower tube part 18 by a grub screw (not shown).

Next the handles 86, 88 are depressed to compress the spring 30 and to separate the stop projections 68, 70. The inner tube 16, 18, and, consequently, the second member 22, thus moves along the axis 20 relatively to the first member 14 in a sense to separate the abutment formations 32 and 38. The handles 86, 88 are depressed to an amount sufficient to ensure that the lower abutment formation 38 on the second member 22 is below the lower inverted internal shoulder near the lower end of the stud 10.

The lever 94 is then pulled upwardly relative to the handle 86 and pivots clockwise (as seen in FIG. 2) about the pivot pin 90. As the lever 94 pivots, the rod 24 moves downwardly relative to the inner tube 16, 18 and the lever 96 pivots anti-clockwise about the pivot pin 92 away from the handle 88. The plunger 26 thus moves downwardly relative to the fingers 34 of the member 22 which are pushed outwardly by the plunger 26.

The handles 86, 88 are allowed to rise under the influence of the spring 30. The lower abutment formation 38 thus comes into engagement with the lower stud shoulder as shown in the left hand half of the lower part of FIG. 1B.

In this position the upper and lower abutment formations 32, 38 are pressed against the respective internal shoulders of the stud under a load determined by the compression in the spring 30. The dial gauge 44 is then read and the reading is noted.

To remove the extensometer, the handles 86, 88 are depressed downwardly and the lever 96 is pushed downwardly relative to the handle 88 and pivots clockwise about the pivot pin 92. As the lever 96 pivots, the rod 24 moves upwardly relative to the inner tube 16, 18 and the lever 94 pivots anti-clockwise about the pivot pin 90 away from the handle 86. The plunger 26 is thus moved upwardly relative to the fingers 34 of the member 22 which return inwardly to their normal, unstressed positions as shown in the right-hand half of the lower part of FIG. 1B.

In those positions of the fingers 34, the lower abutment formation 38 clears the lower internal shoulder of the stud 10 and the extensometer can be withdrawn upwardly from the stud 10 using the handles 86, 88.

The stud is then tensioned, which causes it to extend, by heating and tightening of the nut 12, after which the stud is allowed to cool.

The extensometer is then used again exactly as before to obtain a second reading on the dial gauge 44. The difference between the second and first readings is the extension of the stud 10 due to the tension in it. If the extension is not equal to the required extension, the stud 10 can be further tensioned or relieved, as the case may be, and the extensometer again used to check the extension.

The sensitivity of the extensometer is such that care must be taken to ensure that the temperature of the extensometer is substantially the same as the temperature of the stud 10 on the two occasions of use just mentioned, otherwise there will be a significant error in the value of the extension of the stud 10.

If the material used in the construction of the extensometer has a coefficient of expansion which differs significantly from that of the stud material both measurements must be taken at substantially the same temperature. The provision of the spring 30 ensures that, on both occasions of use, the abutment formations 32 and 38 are pressed against the internal shoulders of the stud 10 under substantially the same load.

In modifications (not shown) the extensometer can be made suitable for indicating extensions of longer studs or bolts or studs or bolts having greater diameters.

In another modification (not shown), the fingers 34 may have unstressed positions corresponding to the positions shown in the left-hand half of the lower part of the FIG. 1B, in which the abutment formations 38 are engageable with the lower internal shoulder of the stud 10. In that case the plunger 26 is dispensed with and instead an annular member movable lengthwise of the fingers in sliding engagement with the outside of the fingers is used to force the fingers together to enable the fingers to be withdrawn clear of the lower shoulder of the stud 10. In such an arrangement the member 22 may be secured to the rod 24 instead of the tube part 18. The lower end of the tube part 18 may form the annular member in sliding engagement with the outside of the fingers.

In another modification (not shown), if the stud or bolt has abutment surfaces which are inverted as compared to those in the stud 10 (i.e. a lower upwardly-facing surface and an upper downwardly-facing surface), the abutment formations 32 and 38 can be exchanged, corresponding changes being made to the remainder of the extensometer. In that modification, the relative movement of the members 14 and 22 from the datum position to stress the spring 30 would be in a sense to move the abutment formations towards one another.

In further modifications (not shown), the dial gauge 44 can be replaced by other suitable indicating means.

For example, a linear scale including a vernier could be used; or a micrometer device could be used; or, if electrical devices are required, a linear voltage differential transformer could be used.

The operation of the extensometer (shown in FIGS. 1 to 5) has been described with reference to studs or bolts which are tensioned by using a heating and cooling cycle. However, it is possible to tension studs or bolts using torque wrenches or hydraulic tensioning equipment. The use of such equipment involves no temperature change. Consequently, when using such equipment, it would be advantageous to monitor the extension, and thus the strain, which the stud or bolt is undergoing during the tightening operation.

A second extensometer adapted for use with hydraulic tensioning equipment will now be described with reference to FIG. 6.

Figure 6:
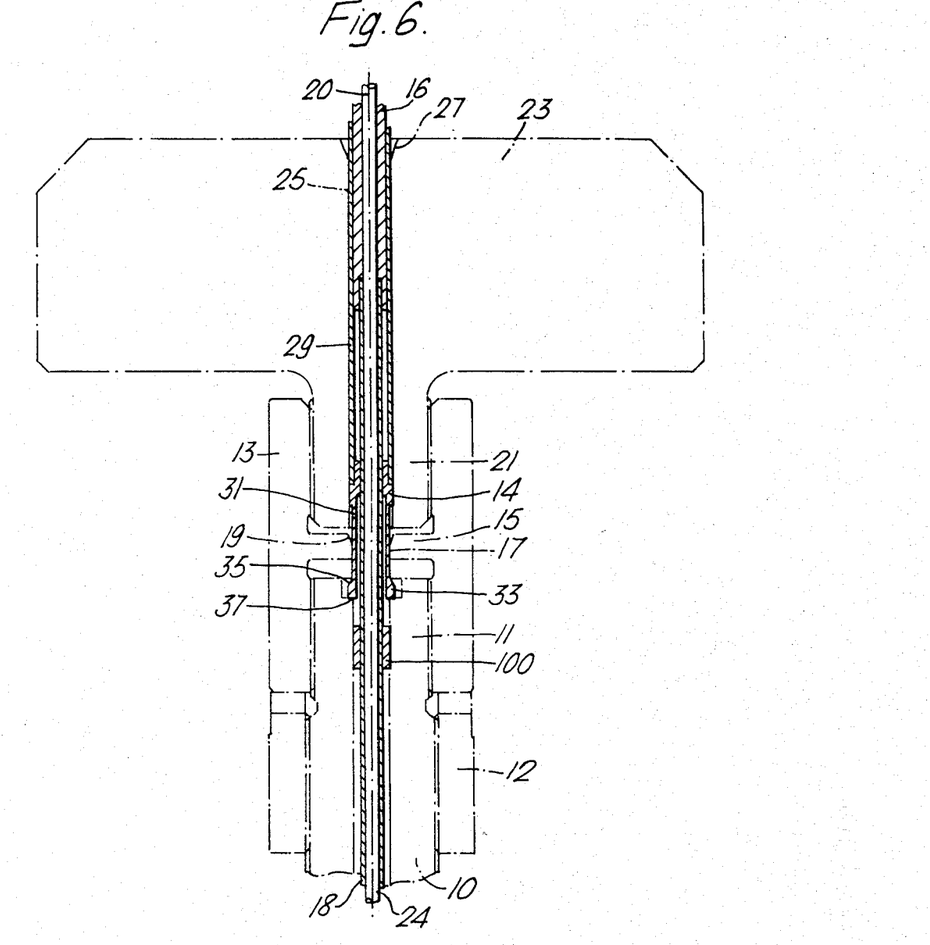
FIG. 6 is a vertical longitudinal cross section through part of a second form of extensometer.

In FIG. 6, the stud 10 has a nut 12 and a threaded extension 11 on which is screwed a double-ended nut 13 which has oppositely-handed threads. The central wall 15 of the nut 13 has a central through-aperture 17 which has a tapered upper entry 19. A threaded boss 21 of a beam 23 of hydraulic tensioning equipment (not otherwise shown) is screwed into the upper end of the nut 13. The beam 23 has a central through-aperture 25 which has a tapered upper entry 27.

Owing to the high forces to which the beam 23 is subjected during use, the through-aperture 25 in the beam 23 has to be limited in size. Consequently, the extensometer described with reference to FIGS. 1 to 5 cannot be used with such equipment and the second extensometer has to be used instead (see FIG. 6).

The upper and lower parts of the second extensometer are the same as the corresponding parts of the first extensometer and, consequently, are not shown in FIG. 6.

In the second extensometer, the first member 14 is in the form of an annular collet-like member which is screwed into the lower end of a relatively thin-walled tube 29. The tube 29 is in sliding engagement with the tube part 16 and the tubular bracket 74 is screwed onto the upper end of the tube 29. The member 14 is of spring steel and has six resilient fingers 31 equiangularly spaced about the axis 20. The fingers 31 each have at their extremities an outwardly-directed projection 33 providing an upwardly-facing sloped shoulder 35 and a downwardly-facing planar shoulder 37. The shoulders 37 severally and collectively form an abutment formation on the first member 14. In their relaxed state, the fingers 31 are substantially parallel to the axis 20. The member 14 has opposed flat-faces (not shown) which accommodate a spanner or like tool which is used to screw the member 14 into the lower end of the tube 29.

The tube part 18 of the inner tube 16, 18 is longer than the corresponding tube part 18 in the first extensometer and the member 14 is in sliding engagement with the longer tube part 18. The diameters of the tube part 18 and the fingers 31 are such that the fingers 31 are displaceable transversely of the axis 20 in a direction towards the axis 20.

OPERATION

The operation of the second extensometer is substantially the same as the operation of the first extensometer. During insertion of the second extensometer into the stud 10, the tapered entries 27 and 19 of the beam 23 and the nut 13, respectively, displace the fingers 31 of the member 14 inwardly towards the axis 20 so that the member 14 will pass through the through-apertures 25 and 17, respectively. Once the projections 33 of the fingers 31 have passed through the through-aperture 17, the fingers 31 relax and the abutment formation 37 engages the upper inner shoulder of the stud 10 as shown in FIG. 6.

Hydraulic jack units (not shown) are placed between the beam 23 and the component which nut 12 engages and are operated to extend the stud 10. The nut 12 is turned while the stud 10 is in its extended condition. The dial gauge 44 can be monitored to determine how much the stud 10 has been extended. Since the dial gauge 44 is set to zero prior to the insertion of the extensometer in the stud 10, if the dial gauge readings for each stud are kept, checks can be made following the completion of the tensioning of all the studs. Creep in studs can be also checked from time-to-time.

When the extensometer is withdrawn from the stud 10, the sloped shoulders 35 of the fingers 31 engage the edges of the through-apertures 17 and 25 and the fingers 31 are displaced inwardly towards the axis 20 so that the member 14 will pass through the through-apertures 17 and 25.

Extensometers constructed in accordance with the invention can be used to determine extensions and creep in components other than studs or bolts provided such components have a suitable aperture for receiving the extensometer and the aperture has oppositely-facing shoulders which can be engaged by the abutment formations on the extensometer.

What we claim is:
1. An extensometer comprising:
   (a) first and second members mutually restrained so as to be capable of relative movement only along a rectilinear axis;
   (b) first and second abutment formations defined on said first and second members, respectively, said first and second abutment formations facing in opposite directions along said axis;
   (c) a spring arranged in relation to said members so as to be stressed by relative movement of said members;
   (d) indicator means which co-operate with said members to indicate the extent of said relative movement; and
   (e) a third member;
   (f) one of said abutment formations being on resilient fingers which extend lengthwise in relation to said axis, which are disposed about said axis and which are in sliding engagement with said third member, said fingers being displaceable transversely of said axis to a position in which said fingers are relatively strained by relative movement along said axis between said fingers and said third member, reverse relative movement along said axis between said fingers and said third member allowing said fingers to return to a position in which said fingers are relatively unstrained.
2. An extensometer comprising:
   (a) first and second members mutually restrained so as to be capable of relative movement only along a rectilinear axis, said first member being a first tube and said second member being an annular collet-like member having resilient fingers which extend lengthwise in relation to said axis and which are disposed about said axis, said fingers each having a shoulder on an outwardly-directed projection at the extremity of said finger, said shoulder facing along said axis and back along said finger;
   (b) first and second abutment formations defined respectively by a plane annular surface at one end of said first member and by said shoulders of said second member, said formations facing towards one another along said axis;
   (c) a second tube which is relatively slidable in said first tube and to which said second member is secured;
   (d) a spring arranged in relation to said members so as to be stressed by relative movement of said members;
   (e) indicator means which co-operate with said members to indicate the extent of said relative movement;
   (f) a third member in sliding engagement with said fingers, said third member being a plunger;
   (g) an operating member which is slidable in said second tube and to one end of which said third member is secured; and
   (h) lever means operable to move said operating member relatively to said second tube;
   (i) said fingers being displaceable transversely of said axis away therefrom to a position in which said fingers are relatively strained by relative movement along said axis between said fingers and said third members, reverse relative movement along said axis between said fingers and said third member allowing said fingers to return to a position in which said fingers are relatively unstrained.
3. An extensometer comprising:
   (a) first and second collet-like members mutually restrained so as to be capable of relative movement only along a rectilinear axis, the members each having resilient fingers which extend lengthwise in relation to said axis and which are disposed about said axis, said fingers each having a shoulder on an outwardly-directed projection at the extremity of each finger, said shoulder facing along said axis and, on said first member, away from said finger and, on said second member, back along said finger;
   (b) first and second abutment formations defined by said shoulders on said first and second members, respectively, said formations facing towards one another along said axis;
   (c) first and second tubes to which said first and second members are secured, respectively, said second tube being relatively slidable in said first tube;
   (d) a spring arranged in relation to said members so as to be stressed by relative movement of said members;
   (e) indicator means which co-operate with said members to indicate the extent of said relative movement;
   (f) a third member in sliding engagement with said fingers of said second member, said third member being a plunger;
   (g) an operating member which is slidable in said second tube and to one end of which said third member is secured; and
   (h) lever means operable to move said operating member relatively to said second tube;
   (i) said fingers of said first member being displaceable transversely of said axis towards said axis to a position in which said fingers are relatively strained and said fingers being capable of returning to a position in which said fingers are relatively unstrained; and (j) said fingers of said second member being displaceable transversely of said axis away therefrom to a position in which said fingers are relatively strained by relative movement along said axis between said fingers and said third member, reverse relative movement along said axis between said fingers and said third member allowing said fingers to return to a position in which said fingers are relatively unstrained.

4. An extensometer according to claim 1, claim 2 or claim 3, in which said spring is stressed by relative movement of said first and second members in a sense to separate said first and second abutment formations.

5. An extensometer according to claim 1, in which said fingers are displaceable transversely of said axis away therefrom so as to strain said fingers.

6. An extensometer according to claim 1, in which said fingers are displaceable transversely of said axis towards said axis so as to strain said fingers.

7. An extensometer according to claim 1, in which said other abutment formation is a plane surface on said member.

8. An extensometer according to claim 1, in which said other abutment formation is on resilient fingers which extend lengthwise in relation to said axis and which are disposed about said axis, said fingers being displaceable transversely of said axis towards said axis to strain said fingers.

9. An extensometer according to claim 1, claim 2 or claim 3, which has brackets secured relative to said first and second members, respectively, said spring being located between said brackets, said brackets each having an annular abutment surface which is engageable with said abutment surface on said other bracket to prevent separation of said brackets.

10. An extensometer according to claim 9, in which one of said brackets is releaseably secured relative to the respective member whereby the separation between said first and second members is adjustable to accommodate different lengths of components.

11. An extensometer according to claim 1, claim 2 or claim 3, which has brackets secured relative to said first and second members, respectively, said spring being located between said brackets, said brackets each having an annular abutment surface which is engageable with said abutment surface on said other bracket to limit said relative movement.

12. An extensometer according to claim 11, in which one of said brackets is releaseably secured relative to the respective member whereby the separation between said first and second members is adjustable to accommodate different lengths of components.

* * * * *